(12) United States Patent
Luo

(10) Patent No.: US 11,962,890 B1
(45) Date of Patent: Apr. 16, 2024

(54) AUTOMATIC SHARING SYSTEM AND METHOD FOR 360-DEGREE PHOTO BOOTH

(71) Applicant: MARVEL TECHNOLOGY (CHINA) CO., LIMITED, Shenzhen (CN)

(72) Inventor: Sheng Guang Luo, Shenzhen (CN)

(73) Assignee: MARVEL TECHNOLOGY (CHINA) CO., LIMITED, Shenzhen (CN)

( * ) Notice: Subject to any disclaimer, the term of this patent is extended or adjusted under 35 U.S.C. 154(b) by 0 days.

(21) Appl. No.: 18/099,315

(22) Filed: Jan. 20, 2023

(30) Foreign Application Priority Data

Dec. 10, 2022 (CN) .......................... 202211583706.6

(51) Int. Cl.
*H04N 23/53* (2023.01)
*H04N 21/4788* (2011.01)
*H04N 23/60* (2023.01)
*H04N 23/62* (2023.01)
*H04N 23/63* (2023.01)
*H04N 23/66* (2023.01)
*G06K 19/06* (2006.01)

(52) U.S. Cl.
CPC ....... *H04N 23/632* (2023.01); *H04N 21/4788* (2013.01); *H04N 23/62* (2023.01); *H04N 23/66* (2023.01); *G06K 19/06037* (2013.01)

(58) Field of Classification Search
CPC .. H04N 23/632; H04N 21/4788; H04N 23/62; H04N 23/66; G06K 19/06037
See application file for complete search history.

(56) References Cited

U.S. PATENT DOCUMENTS

| | | | | |
|---|---|---|---|---|
| 9,578,188 B1* | 2/2017 | Kircher | ................ | H04N 23/632 |
| 11,043,190 B1* | 6/2021 | Broderick | ............. | H04W 12/50 |
| 2012/0230668 A1* | 9/2012 | Vogt | ....................... | H04N 23/50 |
| | | | | 396/428 |
| 2013/0307998 A1* | 11/2013 | Tautenhahn | ......... | H04N 23/661 |
| | | | | 348/207.1 |
| 2019/0364158 A1* | 11/2019 | Curry | ................. | G06Q 20/3276 |

* cited by examiner

*Primary Examiner* — Alazar Tilahun
(74) *Attorney, Agent, or Firm* — Daniel M. Cohn; Howard M. Cohn

(57) ABSTRACT

An automatic sharing method for 360-degree photo booth and an automatic sharing system for 360-degree photo booth are provided. The method includes following steps. A mobile terminal accesses a page of collecting user configuration information, and the user configuration information includes a work receiver specified by user. A server obtains data of the user configuration information submitted by the mobile terminal by a first communication module. A second QR code containing the user configuration information is pushed to the mobile terminal by the first communication module. A verification device scans the second QR code, after the user configuration information is determined to include an information of a specified receiver, the control system pushes control instructions to a 360-degree photo booth by a second communication module to activate a using permission.

7 Claims, 2 Drawing Sheets

AUTOMATIC SHARING SYSTEM AND METHOD FOR 360-DEGREE PHOTO BOOTH

TECHNICAL FIELD

The present disclosure relates to a technical field of photographic camera devices, and in particular to an automatic sharing system for 360-degree photo booth and an automatic sharing method for 360-degree photo booth.

BACKGROUND

A shared commercial economy, such as shared bicycle business, shared car business, shared charger business, etc., provides practical convenience for the public in daily life, makes some resources be used reasonably and fully, enables the public to pay a single payment conveniently and quickly, to enjoy the services they need without buying an entire product.

A 360-degree photo booth, also called 360-degree shooting platform or 360Photobooth, is a platform for 360-degree surround shooting. Compared with ordinary selfies, the 360-degree shooting platform has better entertainment experience. Most of users of such products are trendsetters and fashion icons, who have high pursuit and sensitivity to an appearance, a visual impact, and a user experience atmosphere of the products.

A single 360-degree shooting photo booth costs a fortune. When the shooting photo booth is put into a shopping mall and an entertainment place as a sharing model product, such as a shared KTV, it not only satisfies the entertainment experience of users, but also improves a utilization rate of resources to achieve a win-win situation. However, in a process of using a shared 360-degree photo booth, there are following problems.

The shared 360-degree photo booth is usually limited in number, unlike shared bicycles and shared chargers. The shared bicycles and the shared chargers provide multiple oversupply products more than user's need, and the multiple products correspond to multiple users for using; furthermore, moreover, video files are collected by the shared 360-degree photo booth, compared with audio files collected by the shared KTV, the audio files are small and easy to transfer, however, the video files need to be processed and rendered, and the video files with large capacity is subsequently transmitted to a receiving terminal specified by users, thus having a relatively lengthy process. When multiple users want to use the 360-degree photo booth and the 360-degree photo booth is put into use as a shared device, it is easy to cause the multiple users to queue for a long time, causing low equipment usage efficiency, and causing user to wait for a long time.

SUMMARY

The present disclosure mainly aims at the above technical problems, and provides an automatic sharing method for 360-degree photo booth, and an automatic sharing system for 360-degree photo booth, to solve the technical problems in above background technology.

To achieve the above object, the present disclosure provides an automatic sharing method for 360-degree photo booth, applied in an automatic sharing system for 360-degree photo booth, the automatic sharing system for 360-degree photo booth including a 360-degree photo booth, a server, and a control system; the server including a first communication module, and the 360-degree photo booth including a second communication module, the control system including a user interface and a verification device, a mobile terminal and the control system performing data transmission, command sending, and command receiving with the server by the first communication module, the 360-degree photo booth receiving and executing control instructions from the mobile terminal and the control system by the second communication module; the automatic sharing method including:

accessing a page of collecting user configuration information by the mobile terminal, and the user configuration information including a work receiver specified by user;

obtaining data of the user configuration information by the first communication module, controlled by the server, and the user configuration information being submitted by the mobile terminal; and pushing a second QR code containing the user configuration information to the mobile terminal by the first communication module;

scanning the second QR code by the verification device; after determining that the user configuration information including an information of a specified receiver, pushing the control instructions to the 360-degree photo booth by the second communication module to activate a using permission, controlled by the control system;

controlling the 360-degree photo booth to collect video works by the control system, and transmitting the video works to the server by the first communication module; and sending the video works by the server to the work receiver specified by corresponding user.

Furthermore, the automatic sharing method for 360-degree photo booth specifically includes the following steps:
when scanning the second QR code by the verification device and activating the using permission of the 360-degree photo booth, receiving a touch operation of users by the user interface, and configuring operating parameters of the rotating shooting bracket driven by a driving device of the 360-degree photo booth, controlled by the control system, the operating parameters comprising a rotation speed, a rotation direction, and a rotation duration of the rotating shooting support;
receiving and executing the operating parameters by the second communication module, controlled by the 360-degree photo booth.

Furthermore, the automatic sharing method for 360-degree photo booth specifically includes the following steps:
receiving the touch operation of users by the user interface, and establishing a connection with one or more of mobile terminals by the control system, and pushing the video works by the server to one or more of the mobile terminals by the first communication module for playing and displaying.

Furthermore, the automatic sharing method for 360-degree photo booth specifically includes the following steps:
connecting to a display screen by the control system, and receiving the touch operation of users and pushing the video works to the display screen for playback by the user interface.

Furthermore, the automatic sharing method for 360-degree photo booth specifically includes the following steps:
receiving the touch operation of users by the user interface, and generating an acquisition link for the video works transmitted to a storage unit of the server, and pushing the acquisition link to the display screen to display a third QR code corresponding to the acquisition link.

Furthermore, the automatic sharing method for 360-degree photo booth specifically includes the following steps: receiving the touch operation of users by the user interface, and configuring audio material and/or video material to be added by the control system when capturing the video works; when scanning the second QR code by the verification device and activating the using permission of the 360-degree photo booth, adding the audio material and the video material in the video works when the 360-degree photo booth collects the video works.

Furthermore, the automatic sharing method for 360-degree photo booth specifically includes the following steps:
associating any account of WhatsApp™, Facebook™, Weibo™, WeChat™ AirDrop™, Twitter™, and QQ™ by the server; installing any client of the WhatsApp™, the Facebook™, the Weibo™, the WeChat™, the AirDrop™, the Twitter™, or the QQ™ by the mobile terminal; pushing the second QR code bound to any ID of the WhatsApp™, the Facebook™, the Weibo™, the WeChat™, the AirDrop™, the Twitter™, or the QQ™ to the mobile terminal by a network media client, controlled by the server;
when scanning the second QR code by the verification device and activating the using permission of the 360-degree photo booth, controlling the 360-degree photo booth by the control system to collect the video works, and transmitting the video works to the server by the first communication module; pushing the video works by the server to the mobile terminal corresponding to any ID of the WhatsApp™, the Facebook™, the Weibo™, the WeChat™, the AirDrop™, the Twitter™, or the QQ™ by the network media client.

Furthermore, the automatic sharing method for 360-degree photo booth specifically includes the following steps:
configuring to generate a payment QR code by the control system, and scanning the payment QR code by the mobile device; pointing the payment QR code to a payment interface;
obtaining payment information data by the server; when determining that a payment is successful, pushing the control instructions by the control system to the 360-degree photo booth by a second communication module to activate the using permission.

An automatic sharing system for 360-degree photo booth, including:
a server, including a first communication module and a storage unit;
a 360-degree photo booth, including a supporting stage, a rotating shooting bracket, a second communication module, and a driving device; and
a control system, including a verification device;
where a mobile terminal and the control system perform data transmission, command sending, and command receiving with the server by the first communication module; the 360-degree photo booth receives control instructions of the mobile terminal and the control system by the second communication module, and executes the control instructions.

Compared with an existing technology, the present automatic sharing system and method for 360-degree photo booth first selects to modify the user configuration information, that is, the present disclosure first pushes the second QR code to the mobile terminal, and the user who has the second QR code can use the verification device to scan and determine the second QR code, and activate the using permission of the 360-degree photo booth. The control system controls the 360-degree photo booth to collect the video works. When the 360-degree photo booth arrives at a disembarkation time, the user can leave, and the control system uses a background thread to process video work data and transfer data. The background thread will not affect a front-end UI display of the mobile terminal and/or the control system. The verification device returns to a state of scanning the second QR code, and next user can then activate and use. Since a rear end of the control system transmits the video works to the server by the first communication module, the server then automatically sends the video works to the work receiver specified by the user corresponding to the user ID, when arriving at the disembarkation time, the user need not to wait for the transmission of their video works, avoiding subsequent queues for other users.

REFERENCE NUMBER

Figure 1:
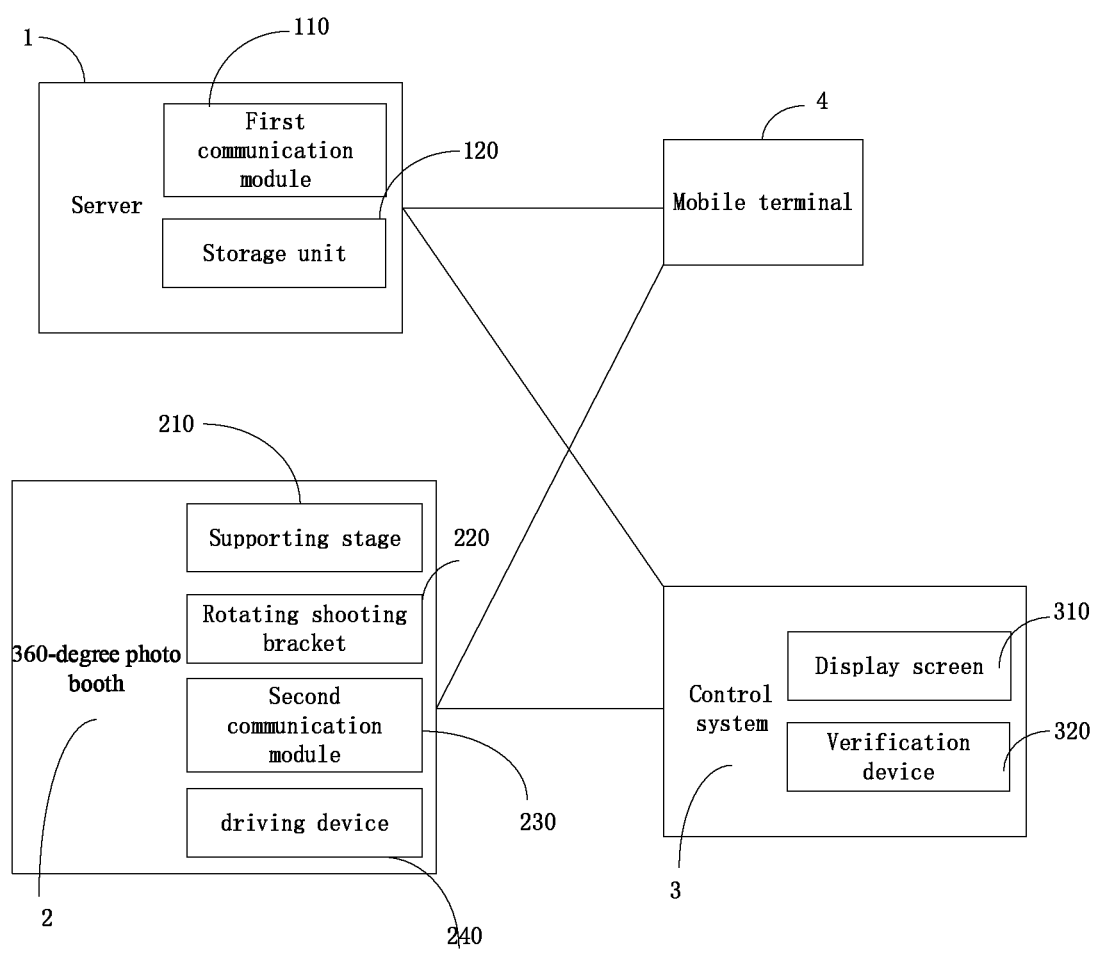
FIG. 1 is a connection block diagram of one embodiment of an automatic sharing system for 360-degree photo booth.

1: server; 110: first communication module; 120: storage unit; 2: 360-degree photo booth; 210: supporting stage; 220: rotating shooting bracket; 230: second communication module; 240: driving device; 3: control system; 310: display screen; 320: verification device; 4: mobile terminal.

DETAILED DESCRIPTION

The present embodiment provides an automatic sharing method for 360-degree photo booth, which is applied in an automatic sharing system for 360-degree photo booth. The automatic sharing system for 360-degree photo booth includes a 360-degree photo booth, a server, and a control system. The server includes a first communication module, and the 360-degree photo booth includes a second communication module. The control system includes a user interface and a verification device. A mobile terminal and the control system perform data transmission, command sending, and command receiving with the server by the first communication module. The 360-degree photo booth receives and executes control instructions from the mobile terminal and the control system by the second communication module. The method includes following steps:

the mobile terminal accesses a page of collecting user configuration information, and the user configuration information includes a work receiver specified by the user;

the server obtains data of the user configuration information submitted by the mobile terminal by the first communication module; and pushes a second QR code containing the user configuration information to the mobile terminal by the first communication module;

the verification device scans the second QR code; after determining that the user configuration information includes an information of a specified receiver, the control system pushes the control instructions to the 360-degree photo booth by the second communication module to activate a using permission;

the control system controls the 360-degree photo booth to collect video works and transmit the video works to the server by the first communication module; and the server sends the video works to the work receiver specified by corresponding user.

In some embodiments, the verification device can be a camera installed in the control system, and the control system calls the verification device. When the 360-degree photo booth is not used by the user, the verification device continues to scan until the second QR code displayed on the mobile terminal is scanned for verification, and the using permission is activated. The video works collected by the 360-degree photo booth are bound to the current user ID, and the collected video works are sent to the work receiver specified by the user corresponding to the user ID.

The automatic sharing method for 360-degree photo booth arranges time-saving, orderly allocation and distribution for multiple users queuing up to use the 360-degree photo booth.

Preferably, the mobile terminal scans a first QR code, and the first QR code refers to the page of collecting the user configuration information.

In addition, the mobile terminal is also able to jump to access the page of collecting the user configuration information by a corresponding link displayed on the WeChat official account dialog interface; or the mobile terminal jumps to access the page of collecting the user configuration information by inputting an access address in a browser of the mobile terminal.

In a preferred embodiment, the first QR code is displayed on a display screen, or placed around the 360-degree photo booth in the form of a picture, and the first QR code can be scanned by multiple users. After the mobile terminal scans the first QR code, the mobile terminal jumps to a page of collecting the user configuration information. The user configuration information includes the work receiver specified by the user. Since the work receiver includes. but not limited to mobile multimedia messages (MMS) receiving number, email address, WhatsApp number, Facebook™, Weibo™, WeChat™, AirDrop™, Twitter™, QQ™ local storage space and other specified receivers, the user is required to perform corresponding account binding verification in the user configuration information. Different users have different operation speeds, and it may happen that users who first scan the first QR code to choose to modify the user configuration information will submit the user configuration information and then generate the second QR code later than users who later scan the first QR code to choose to modify the user configuration information.

The present method first selects to modify the user configuration information, that is, the present method first pushes the second QR code to the mobile terminal, and the user who has the second QR code can use the verification device to scan and determine the second QR code, and activate the using permission of the 360-degree photo booth. The control system combined with the 360-degree photo booth to collect the video works. When the 360-degree photo booth has been selected using duration by user arrives at disembarkation time, the user can leave, and the control system uses a background thread to process video work data and transfer data. The background thread will not affect a front-end UI display of the mobile terminal and/or the control system. The verification device returns to a state of scanning the second QR code, and next user can then activate and use. Since a rear end of the control system transmits the video works to the server by the first communication module, the server then automatically sends the video works to the work receiver specified by the user corresponding to the user ID, when arriving at the disembarkation time, the user need not to wait for the transmission of their video works, avoiding subsequent queues for other users.

Such above steps of the method can greatly solve problems of long queues of many people and problems of low equipment use efficiency.

In some embodiments, the verification device is installed on the rotating shooting bracket of the 360-degree photo booth. After the verification device scans the second QR code displayed on the mobile terminal for verification, the verification device with a lens, is called by the control system. Since a position of the verification device has been adapted and adjusted, a quality of the collected videos is better, and the control system processes and renders the collected the video files and locally stores the video files.

When the verification device of the control system is selected to collect the video works, and the user wants to transfer the collected video works to the mobile terminal for local storage, then the control system transmits the video works to the server by the first communication module, and the server transmits the video works to the mobile terminal by the first communication module for local storage.

In some embodiments, the program of the control system detects and analyzes that a quantity of other mobile terminals that have currently scanned the first QR code is lower than a predetermined value, and there are basically no users or few users queuing up, users who collect the video files by using the 360-degree photo booth can edit and share the video files by a user interface of the control system.

In one embodiment, when a quantity of subsequent users is small and there is basically no queue or less queue, after the mobile terminal scans the first QR code displayed on the display screen, the control system is specified to collect the user configuration information, and receives touch operation of users by an initial user interface of the control system to select styles of shooting works, such as photo style, video style, slow motion style, roundabout style, GIF style, etc. The control system receives the touch operation of users to the shooting button to enter a shooting state, and a shooting equipment starts to shoot and record video works. The user interface receives the touch operation of users to select a sharing receiver, such as an MMS receiving number, an email address, a third-party APP sharing and publishing, etc. After processing of the server, the data of the video works will be sent to the specified receiver according to a sharing method selected by the user. After completing a sending of the data, the page of the control system will automatically return to the initial user interface, waiting for the next user's operation. In one embodiment, the control system includes a countdown module. The countdown time can be configured for each of the above steps by the countdown module. If there is no operation within a specified time, the control system will automatically jump to the next page according to a default selection. Such a cycle including above steps can realize a shared station mode without human intervention.

The automatic sharing method for 360-degree photo booth specifically includes the following steps.

When the verification device scans the second QR code and activates the using permission of the 360-degree photo booth, the user interface receives the touch operation of users, and the control system configures operating parameters of the rotating shooting bracket driven by a driving device of the 360-degree photo booth. The operating parameters include a rotation speed, a rotation direction, and a rotation duration of the rotating shooting support.

The 360-degree photo booth receives and executes the operating parameters by the second communication module.

By selecting and matching rotation speed control parameters, rotation direction control parameters, and rotation duration control parameters of the rotating shooting bracket driven by the driving device, corresponding rotation speed control instructions, rotation direction control instructions, and rotation duration control instructions are generated. After activating the using permission the 360-degree photo booth, the above operating parameters are finally sent to the driving device of the 360-degree photo booth. The driving device includes a programmable MCU central processing unit, a power supply circuit, a motor driving module, a motor current detection circuit, a motor, and a transmission component. The MCU central processing unit analyzes the operating parameters, controls the motor to execute. The motor outputs power to the rotating shooting bracket by the transmission component. The shooting equipment installed on the rotating shooting bracket moves with the rotating shooting bracket when the shooting equipment collecting images, therefore enriching a visual effect of the collected videos.

The automatic sharing method for 360-degree photo booth specifically includes the following steps.

The user interface receives the touch operation of users, and the control system establishes a connection with one or more of the mobile terminals, and the server pushes the video works to one or more of the mobile terminals by the first communication module for playing and displaying.

After the control system establishes the connection with one or more of the mobile terminals, one or more of the mobile terminals obtain access permission, and after obtaining the access permission, one or more of the mobile terminals can obtain and display the corresponding video works shared by users.

When the user uses the control system to collect the video works, the video works are stored in a storage unit of the control system, and the mobile terminal can establish the connection with the control system by a local area network, therefore reducing a process of transmitting video works by the first communication module and the server, and making the mobile terminal download and display the video works directly from the control system.

The automatic sharing method for 360-degree photo booth also includes the following steps.

The control system connects to the display screen, and the user interface receives the touch operation of users, and pushes the video works to the display screen for playback.

The control system and the display screen can push the video files stored locally to the display screen for playback by means of an extended screen projection or a mirror projection.

The automatic sharing method for 360-degree photo booth also includes the following steps.

The user interface receives the touch operation of users, and generates an acquisition link for the video works transmitted to the storage unit of the server, and pushes the acquisition link to the display screen to display a third QR code corresponding to the acquisition link.

A current user and other users can scan the third QR code displayed on the display screen to browse or download the video works.

In addition, the access permission can also be set, and multiple mobile terminals obtaining the access permission can obtain corresponding video works shared by users.

The mobile terminal is connected to the display screen by a WIFI signal or a wired signal. In some embodiments, the mobile terminal is connected to the display screen by a definition multimedia interface (HDMI), the mobile terminal can preset an extended user interface, and the extended user interface includes pictures of the video works being played and a third QR code picture. The mobile terminal extends the extended user interface to the display screen. In this way, other users can download works by scanning codes on the display screen without affecting other business operations of the mobile terminal and the control system.

In some embodiments, the display screen can be configured as a mirrored screen projection. In this case, the interface of the mobile terminal/control system is consistent with the interface of the display screen. In the user interface of the mirror projection screen, when the video works are shot and uploaded, an image of the third QR code of the latest video work will be displayed on the display screen, which is convenient for users to scan the third QR code to download.

The user interface receives the touch operation of users, and the control system configures audio material and/or video material to be added when capturing the video works. When the verification device scans the second QR code and activates the using permission of the 360-degree photo booth, the audio material and the video material are added in the video works when the 360-degree photo booth collects the video works.

The user interface receives the touch operation of users, and collects shooting background pictures, sticker props, background music and other materials specified by the user, therefore adding personalized effects. In the following steps, the shooting equipment of 360-degree photo booth will add the corresponding materials when collecting the video works according to the configured materials.

In some embodiments, the user configuration information interface can call template files of the mobile terminal, the control system, and a database of the server for the user to select. The user can also customize the materials selected and matched by the user, and generate templates according to the materials, and share the templates in a template database for other users to select. A supporting stage of the 360-degree photo booth can accommodate a limited number of people. If there are a large number of users in a group, the 360-degree photo booth can be used in batches and share the same set of templates.

The automatic sharing method for 360-degree photo booth also includes the following steps.

A screen and/or the display screen of the mobile terminal receives the touch operation of users, and shares the video works transmitted to the storage unit of the server to a predetermined work library.

An individual user can upload and share his video works to the predetermined work library.

If there are many users in a group, the 360-degree photo booths can be used in batches. For users in batches, the video works can be uploaded to a specified space work library of the server after the collection of the video works is completed on the user configuration information interface. The video works of all users participating in the same party shared station can be shared with each other.

In some embodiments, the space work library can be configured with an administrator, and the administrator creates the shared station as a space work library and sets main parameters, and the administrator can manage the works and albums of all shared stations, delete or clean up a space, and manage the materials of the shared station, and manage the works of all members participating in the sharing station, etc.

In some embodiments, when the administrator creates the shared station, the administrator can select multiple stickers and combine the stickers into one sticker, therefore realizing a way of freely setting stickers. The administrator can set a size of a file when creating an activity, and set whether participants can modify stickers and background music. The administrator can also set a countdown time for each step of the shared station or an automatic shared station.

The user configuration information can also include setting a theme name of a group shared station, and presetting setting parameters of collected video works, such as the rotation speed, the rotation direction, and rotation duration of the rotating shooting bracket of the 360-degree photo booth, parameters such as a shooting ratio, a shooting frame rate, a shooting duration, a countdown to shooting duration, a video or photo resolution, a compression level, a slow motion frame rate, a filter level, a beauty level and other parameters when the mobile terminal and/or the control system collects the video works. The user configuration information can also include setting specified sticker props, background images, a background music and other parameters. Other mobile terminals can join the shared station by scanning codes, and enter a user interface of the shared station, and one terminal device will be selected as a device for collecting the video works. If one terminal device joins the shared station in a form of the device for collecting the video works, a user interface of the device will be displayed with a set shooting page UI, and the user interface of the device includes a shooting style selection button, a one-key shooting button. If one terminal device joins the shared station in a form of a common shared device, the user interface of the device will display a shared UI, and a work list of current shared station of the shared UI.

In some embodiments, the steps for user finally using the shared station includes as follow steps: 1. a photographing format, such as a photo, a video is selected; 2. after a selection is completed, the screen and/or the display screen of the mobile terminal receives the touch operation of users to start a shooting, simultaneously a voice for broadcasting countdown time is played, after the countdown time is over, a video shooting is started; 3. after the video is shot, an editing user interface is entered, in the editing user interface, the user edits the video or a photo, such as adding stickers, adding photo frames, adding text, adding dynamic effects, adding video cropping, adding filter effects, adding beauty effects, etc.; 4. after the screen and/or the display screen of the mobile terminal receives the touch operation of users and completes a editing of a video work, the screen of the mobile terminal and/or the control system starts to automatically render and generate the video work, according to a sharing method selected by the user, such as a SMS, an email, a QR code picture, a WhatsApp, etc., the control system will send the video work for the user to a specified sharing address after the user filling in the sharing method; 5. after the video work is sent, the control system will automatically return to an initial page, waiting for a next user to shoot, thus a function of the shared station is completed. Each step of the above shared station has one countdown time. If the time of one step exceeds corresponding countdown time, the control system will automatically jump to a next step to avoid a reduction of equipment usage efficiency caused by waiting for a long time.

The automatic sharing method for 360-degree photo booth also includes the following steps.

The server is associated with any account of the WhatsApp™, the Facebook™ Weibo™, the WeChat™, the AirDrop™, the Twitter™, and the QQ™, and the mobile terminal installs any client of the WhatsApp™, the Facebook™, the Weibo™, the WeChat™, the AirDrop™, the Twitter™, or the QQ™. The server pushes the second QR code bound to any ID of the WhatsApp™, the Facebook™, the Weibo™, the WeChat™, the AirDrop™, the Twitter™, or the QQ™ to the mobile terminal by a network media client.

When the verification device scans the second QR code and activates the using permission of the 360-degree photo booth, the control system controls the 360-degree photo booth to collect the video works, and transmits the video works to the server by the first communication module. The server pushes the video works to the mobile terminal corresponding to any ID of the WhatsApp™, the Facebook™, the Weibo™, the WeChat™, the AirDrop™, the Twitter™, or the QQ™ by the network media client.

Any ID of the WhatsApp™, the Facebook™, the Weibo™, the WeChat™, the AirDrop™, the Twitter™, the QQ™ is an account registered and logged in by the user.

In some embodiments, the mobile terminal scans the first QR code displayed on the display screen, collects a user configuration information page to guide attention to a subscription number of the WeChat™, and the subscription number automatically pushes the QR code bound to the user's WeChat ID. When the user scans the QR code by the verification device, the control system analyzes the QR code and simultaneously activates a WeChat payment interface. After the user pays a specified fee, the using permission is activated, the control system is started to control the 360-degree photo booth to shoot the video works. After a shooting process and a rendering process of the video works are completed, the video works will be automatically sent to the user's WeChat ID to realize an automatic sharing mode of independent payment.

In some embodiments, when multiple users complete a submission of user configuration information and payment information data, the server can sort according to an order of payment, making a process of verifying the second QR code distribute in an orderly manner again, and displaying the number of people queuing in ahead on a page of the mobile terminal.

The automatic sharing method for 360-degree photo booth specifically includes the following steps:
  the control system being configured to generate a payment QR code, and the mobile device scanning the payment QR code; the payment QR code pointing to a payment interface;
  the server obtaining payment information data; when determining that a payment is successful, the control system pushing the control instructions to the 360-degree photo booth by a second communication module to activate the using permission.

To sum up, the automatic sharing method for 360-degree photo booth can collect a variety of user configuration information in advance, which solves a problem of queuing for a long time for people and a problem of low equipment using efficiency.

Figure 2:
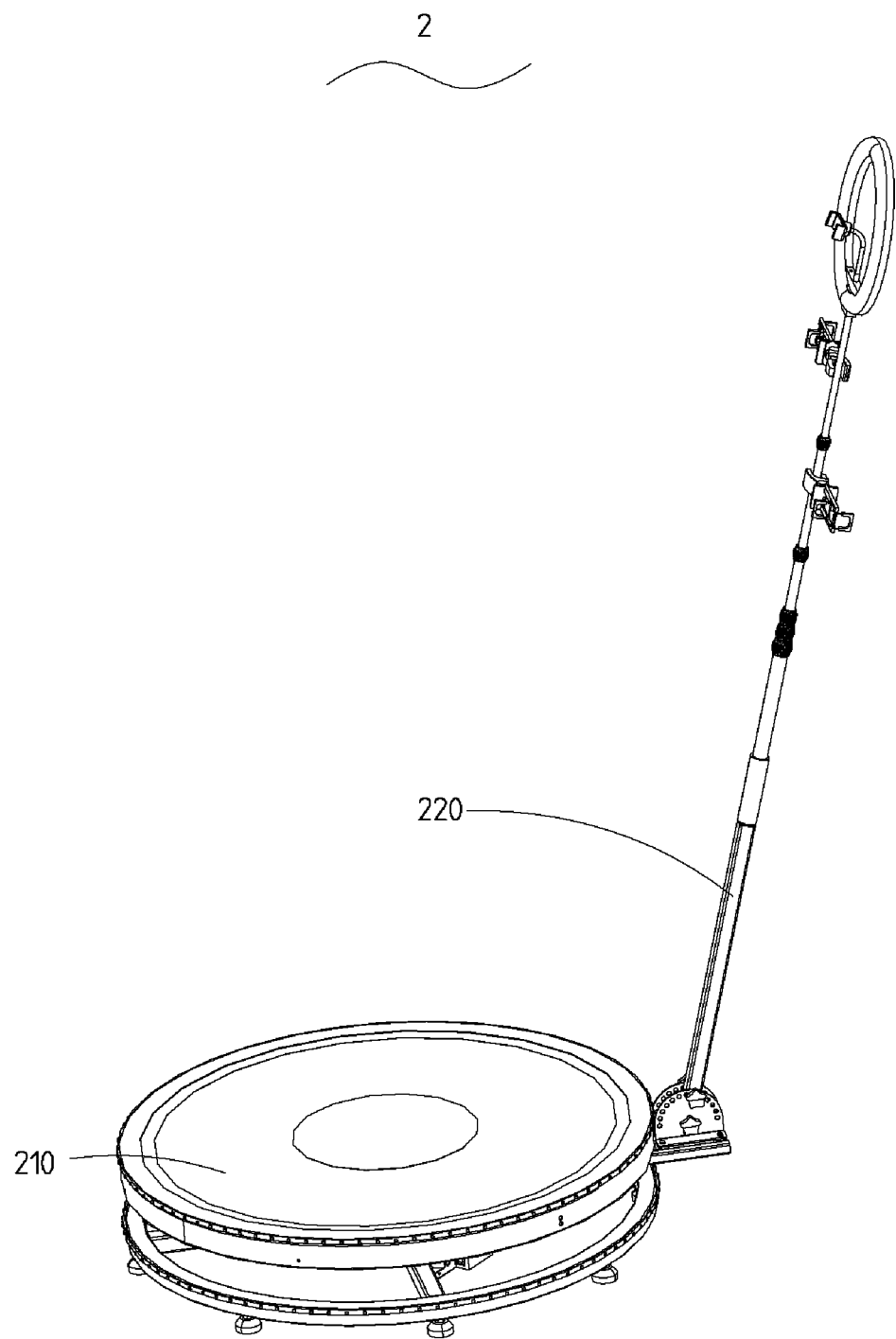
FIG. 2 is a schematic diagram of one embodiment of the 360-degree photo booth with the automatic sharing system of FIG. 1.

Please refer to FIG. 1 and FIG. 2, an automatic sharing method for 360-degree photo booth includes:
  a server 1, including a first communication module 110, and a storage unit 120;
  a 360-degree photo booth 2, including a supporting stage 210, a rotating shooting bracket 220, a second communication module 230, and a driving device 240; and a control system 3, including a verification device 320;
where, a mobile terminal 4 and the control system 3 perform data transmission, command sending, and command receiving with the server 1 by the first communication module 110; the 360-degree photo booth 2 receives control instructions of the mobile terminal 4 and the control system 3 by the second communication module 230, and then executes the control instructions.

The server 1 can be a cloud service, and the server 1 communicates with the control system 3 and the mobile terminal 4 by the first communication module 110, responds to and executes an access request from the mobile terminal 4. The storage unit 120 is configured to store video works of the user. The mobile terminal 4 can be configured with a personal center, which can manage and view a storage space size of the storage unit 120 with a cloud service of the server 1, and usage of a cloud service storage space. Users can view the shared stations that are currently invited to participate, and users can select the sharing station in a personal center to join, and upload their own music material files. Users can also log in to a cloud service backend through the PC, and upload their own music or sticker materials to the cloud service backend by the PC.

The control system 3 is a smart device or a computer device including a programmable processor, a storage medium, and a communication unit, such as a GoPro action camera, a mobile phone, a tablet computer. The communication unit of the control system 3 communicates with the server 1 by the first communication module 110, and the display screen 310 can display the video works stored in the server 1. When the control system 3 is a GoPro action camera, the user can use the mobile terminal 4 to connect to the GoPro by a wirelessly or wired way to control shooting. The user can control a frame rate, a resolution, a focal length, exposure, a flash, etc. of a camera by the mobile terminal 4.

In some embodiments, the control system 3 is an iPad or a smart phone. The control system 3 downloads the video works from the cloud service of the server 1 by Hyper Text Transfer Protocol (HTTP) or Transmission Control Protocol (TCP), and pushes the video works to the display screen 310 for display. In some embodiments, the control system 3 connects to the mobile terminal 4 by a local area network, and downloads downloaded video works from the mobile terminal 4. Finally, user can process the video works by the control system 3, such as compressing, sharing a download address to a SMS or an Email, converting a download address to a QR code, the WhatsAPP™ or other third-party APP.

The supporting stage 210, the rotating shooting bracket 220, the second communication module 230, and the driving device 240 in the 360-degree photo booth 2 can be realized by using a 360-degree photo booth equipment in the prior art, and will not be described in detail here.

In some embodiments, a sensor is set near the verification device 320, and when the sensor detects that an object is approaching the verification device 320, and the verification device 320 then enables scanning work, thus extending a service life of the lens of the verification device 320.

In some embodiments, a quantity of the display screens 310 is one, which is integrated with the control system 3. In some embodiments, the quantity of the display screens 310 is at least two, one of two display screens is integrated with the control system 3 and has a touch control function, and the other one of two display screens is connected to the control system 3 and the mobile terminal 4 by a wired or wireless way, and is configured to display the first QR code and play the video works.

The server 1, the control system 3, the mobile terminal 4, and the 360-degree photo booth 2 are connected by the first communication module 110, the second communication module 230, and the communication module in any communication way of 3G/4G/5G network, wireless fidelity (WIFI), or Bluetooth.

What is claimed is:

1. An automatic sharing method for 360-degree photo booth, applied in an automatic sharing system for 360-degree photo booth, the automatic sharing system for 360-degree photo booth comprising a 360-degree photo booth, a server, and a control system; the server comprising a first communication module, and the 360-degree photo booth comprising a second communication module; the control system comprising a user interface and a verification device, a mobile terminal and the control system performing data transmission, command sending, and command receiving with the server by the first communication module, the 360-degree photo booth receiving and executing control instructions from the mobile terminal and the control system by the second communication module; the automatic sharing method comprising:
    accessing a page of collecting user configuration information by the mobile terminal, and the user configuration information comprising a work receiver specified by user;
    obtaining data of the user configuration information by the first communication module, controlled by the server, and the user configuration information being submitted by the mobile terminal; and pushing a second QR code containing the user configuration information to the mobile terminal by the first communication module;
    scanning the second QR code by the verification device; after determining that the user configuration information comprising an information of a specified receiver, pushing the control instructions to the 360-degree photo booth by the second communication module to activate a using permission, controlled by the control system;
    controlling the 360-degree photo booth to collect video works by the control system, and transmitting the video works to the server by the first communication module, the control system uses a background thread to process video work data and transfer data, the background thread will not affect a front-end UI display of the mobile terminal and/or the control system; and sending the video works by the server to the work receiver specified by corresponding user;
    when scanning the second QR code by the verification device and activating the using permission of the 360-degree photo booth, receiving a touch operation of users by the user interface, and configuring operating parameters of the rotating shooting bracket driven by a driving device of the 360-degree photo booth, controlled by the control system, the operating parameters comprising a rotation speed, a rotation direction, and a rotation duration of the rotating shooting support;
    receiving and executing the operating parameters by the second communication module, controlled by the 360-degree photo booth.

2. The automatic sharing method for 360-degree photo booth as recited in claim 1, wherein the automatic sharing method for 360-degree photo booth further comprises:

receiving the touch operation of users by the user interface, and establishing a connection with one or more of mobile terminals by the control system, and pushing the video works by the server to one or more of the mobile terminals by the first communication module for playing and displaying.

3. The automatic sharing method for 360-degree photo booth as recited in claim 1, wherein the automatic sharing method for 360-degree photo booth further comprises:
connecting to a display screen by the control system, and receiving the touch operation of users and pushing the video works to the display screen for playback by the user interface.

4. The automatic sharing method for 360-degree photo booth as recited in claim 3, wherein the automatic sharing method for 360-degree photo booth further comprises:
receiving the touch operation of users by the user interface, and generating an acquisition link for the video works transmitted to a storage unit of the server, and pushing the acquisition link to the display screen to display a third QR code corresponding to the acquisition link.

5. The automatic sharing method for 360-degree photo booth as recited in claim 1, wherein the automatic sharing method for 360-degree photo booth further comprises:
receiving the touch operation of users by the user interface, and configuring audio material and/or video material to be added by the control system when capturing the video works; when scanning the second QR code by the verification device and activating the using permission of the 360-degree photo booth, adding the audio material and the video material in the video works when the 360-degree photo booth collects the video works.

6. The automatic sharing method for 360-degree photo booth as recited in claim 1, wherein the automatic sharing method for 360-degree photo booth further comprises:
associating any account of WhatsApp™, Facebook™, Weibo™, WeChat™, AirDrop™ Twitter™, and QQ™ by the server; installing any client of the WhatsApp™, the Facebook™ the Weibo™, the WeChat™, the AirDrop™, the Twitter™, or the QQ™ by the mobile terminal; pushing the second QR code bound to any ID of the WhatsApp™, the Facebook™, the Weibo™, the WeChat™, the AirDrop™, the Twitter™, or the QQ™ to the mobile terminal by a network media client, controlled by the server;
when scanning the second QR code by the verification device and activating the using permission of the 360-degree photo booth, controlling the 360-degree photo booth by the control system to collect the video works, and transmitting the video works to the server by the first communication module; pushing the video works by the server to the mobile terminal corresponding to any ID of the WhatsApp™, the Facebook™, the Weibo™, the WeChat™, the AirDrop™, the Twitter™, or the QQ™ by the network media client.

7. The automatic sharing method for 360-degree photo booth as recited in claim 1, wherein the automatic sharing method for 360-degree photo booth further comprises:
configuring to generate a payment QR code by the control system, and scanning the payment QR code by the mobile device; pointing the payment QR code to a payment interface;
obtaining payment information data by the server; when determining that a payment is successful, pushing the control instructions by the control system to the 360-degree photo booth by a second communication module to activate the using permission.

\* \* \* \* \*